United States Patent
Katiyar et al.

(10) Patent No.: US 10,685,405 B2
(45) Date of Patent: *Jun. 16, 2020

(54) AUTOMATED COST CALCULATION FOR VIRTUALIZED INFRASTRUCTURE

(71) Applicant: VMware, Inc., Palo Alto, CA (US)

(72) Inventors: Abhinav Katiyar, Sunnyvale, CA (US); Hemanth Kumar Pannem, Bangalore (IN); Dharmaraj Thangavelu, Chennai (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,488

(22) Filed: Aug. 5, 2014

(65) Prior Publication Data

US 2015/0081484 A1  Mar. 19, 2015

Related U.S. Application Data

(63) Continuation of application No. 13/082,247, filed on Apr. 7, 2011, now Pat. No. 8,799,897.

(51) Int. Cl.
| | |
|---|---|
| *G06F 9/455* | (2018.01) |
| *G06Q 40/00* | (2012.01) |
| *G06Q 20/14* | (2012.01) |
| *G06F 9/50* | (2006.01) |

(52) U.S. Cl.
CPC ......... *G06Q 40/12* (2013.12); *G06F 9/45533* (2013.01); *G06Q 20/145* (2013.01); *G06F 9/5077* (2013.01)

(58) Field of Classification Search
CPC ... G06F 9/45533; G06F 9/5077; G06Q 40/12; G06Q 20/145
USPC ............................................................ 718/1
See application file for complete search history.

(56) References Cited

U.S. PATENT DOCUMENTS

| | | |
|---|---|---|
| 2009/0164356 A1 | 6/2009 | Bakman |
| 2009/0292654 A1 | 11/2009 | Katiyar et al. |
| 2009/0299920 A1 | 12/2009 | Ferris et al. |

*Primary Examiner* — James J Lee

(57) ABSTRACT

In one embodiment, a method includes storing a cost assigned to a physical computing device in a storage device. The physical computing device is found in a physical infrastructure of a data center. The method determines an instantiation of a virtual machine in a virtual infrastructure. Information for a provisioning of the virtual machine with the physical computing device in the physical infrastructure of the data center is then received. The cost assigned to the physical computing device from the storage device is determined where the cost is used to determine a charge for the virtual machine based on usage of the physical computing device.

20 Claims, 7 Drawing Sheets

Host H1

250a:

| Computing resource | Cost ($ per hour) |
|---|---|
| CPU | 2 |
| Memory | 1 |
| Disk Read and Write | .50 |
| Network received | .50 |
| Network sent | .75 |

Host H2

250b:

| Computing resource | Cost ($ per hour) |
|---|---|
| CPU | 3 |
| Memory | 1.5 |
| Disk Read and Write | 1 |
| Network received | 1 |
| Network sent | 1.25 |

Fig. 2b

AUTOMATED COST CALCULATION FOR VIRTUALIZED INFRASTRUCTURE

This application is a continuation of U.S. Pat. No. 8,799,897 filed Apr. 7, 2011, which is hereby incorporated by reference herein in its entirety.

BACKGROUND

A chargeback application may be used to account for the operational costs involved in providing and maintaining an information technology (IT) infrastructure, including the costs for IT services and applications. Measuring resource utilization and calculating the corresponding IT operational cost enable a data center to account for the IT resources utilized and bill for the services provided.

A customer of the data center may be an entity, such as a business, that may be organized in various departments or business units. Each department may use different computing resources of the data center. The data center then may charge the entity by department. For example, a bill may be generated detailing charges per department.

In a non-virtualized environment, a physical server and the associated resources like the applications running on the server can be easily mapped to a department using them, making the billing for such resource utilizations relatively easy. Also, costs incurred due to maintenance and licensing can be directly associated to a department, thereby enabling the data center to calculate the complete IT operational costs.

In a virtualized environment, however, the task of calculating the IT operational cost for each department becomes more difficult. Multiple virtual machines run on a physical server, which might be shared across different departments in the entity. As a result, resource utilization for this server and, therefore, the cost incurred cannot be directly associated to any single department. The difficulty in accounting for the data center gets further compounded when applications and services get shifted over time to different servers, based on the load and available infrastructure resources.

In using the virtualized environment, the customer of the data center may instantiate a number of virtual machines (VMs) in a virtual infrastructure. The virtual infrastructure may be a listing of departments and which virtual machines have been instantiated by each department. A configuration may be used to specify computing resources that are desired. For example, the configuration may include types of computing resources (e.g., a host with a certain processing speed) or fixed levels of service that can be provided.

A data center administrator is a user who configures costs for using resources of the data center. The data center administrator may assign a cost to a virtual machine based on the desired configuration. For example, based on the type of computing resources requested, the data center administrator assigns a cost to the virtual machine. In this case, the cost may be input using the chargeback application and associated with the virtual machine in the virtual infrastructure.

Other methods for assigning the cost to a virtual machine include defining fixed levels of access. For example, the fixed levels may determine certain types of resources that can be used by a virtual machine. In one example, a small level may include a certain amount of CPU speed and storage, such as a CPU speed of 1 GHz and storage of 1 GB. The small level may be a fixed cost of $0.05 per hour. A medium level may include a higher level of computing resources and rates. For example, computing resources for the medium level may include a CPU speed of 1.5 GHz and 2 GB of storage for the cost of $0.10 per hour. A customer may select which level to apply to a virtual machine. The rate for the level is then assigned to the virtual machine.

Once the virtual machine is instantiated, the virtual machine may be provisioned with computing devices in the data center. The provisioning may be performed before or after assignment of the cost to the virtual machine. However, the data center administrator assigning the cost may not be aware of which computing devices are provisioned with the virtual machine. Rather, the configuration requested is used to determine the cost. The usage of the provisioned computing resources is then monitored. Using the cost assigned to the virtual machine, a charge for the usage may be determined for the customer.

If the data center administrator is not aware of which computing devices are provisioned with the virtual machine, the costs assigned may not be reflective of the service being provided. For example, a virtual machine may be assigned to a computing device that is considered a more expensive computing device in the data center. The cost assigned to the virtual machine may not be reflective of the higher level of service that this computing device is providing.

The use of virtual machines may change frequently for a customer. For example, different divisions of the customer may instantiate or remove virtual machines from the virtual infrastructure. When a new virtual machine is instantiated, the data center administrator has to analyze the requested computing resources for the virtual machine and input a cost for that virtual machine. This may be a time-consuming process because of the frequency in which virtual machines are added and removed.

SUMMARY

In one embodiment, a method includes storing a cost assigned to a physical computing device in a storage device. The physical computing device is found in a physical infrastructure of a data center. The method determines an instantiation of a virtual machine in a virtual infrastructure. Information is received for provisioning of the virtual machine with the physical computing device in the physical infrastructure of the data center. The cost assigned to the physical computing device from the storage device is determined where the cost is used to determine a charge for the virtual machine based on usage of the physical computing device.

In one embodiment, the cost is assigned to a computing resource of the physical computing device and the usage of the computing resource is used to determine the charge.

In one embodiment, the method receives a selection of one or more attributes for a computing resource of the physical computing device and a selection of an operation. An expression is generated from the selection of the one or more attributes and the operation where the expression used to determine the charge when the computing resource is used by the virtual machine.

In one embodiment, the method includes determining a plurality of tiers for a computing resource of the physical computing device; assigning a cost to each tier; determining the virtual machine is associated with the computing resource included in a tier in the plurality of tiers; and using the cost of the tier to determine the charge for the virtual machine.

In another embodiment, a non-transitory computer-readable storage medium containing instructions for controlling a computer system is provided. The computer system is operable to: store a cost assigned to a physical computing device in a storage device, the physical computing device being found in a physical infrastructure of a data center; determine an instantiation of a virtual machine in a virtual infrastructure; receive information for a provisioning of the virtual machine with the physical computing device in the physical infrastructure of the data center; and retrieve the cost assigned to the physical computing device from the storage device, wherein the cost is used to determine a charge for the virtual machine based on usage of the physical computing device.

In another embodiment, a method includes storing a plurality of costs to a plurality of computing resources in a data storage device. The plurality of computing resources are found in a physical infrastructure. The usage of a computing resource by a virtual machine is measured in a virtual infrastructure. A physical computing device in the physical infrastructure is determined that is associated with the computing resource. A cost assigned to the computing resource is retrieved from the data storage device based on the determined physical computing device. A charge is determined for the virtual machine based on the measured usage of the computing resource and the determined cost assigned the computing resource.

The following detailed description and accompanying drawings provide a more detailed understanding of the nature and advantages of the present invention.

BRIEF DESCRIPTION OF THE DRAWINGS

FIG. 2b shows an example of configured costs for computing resources according to one embodiment.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
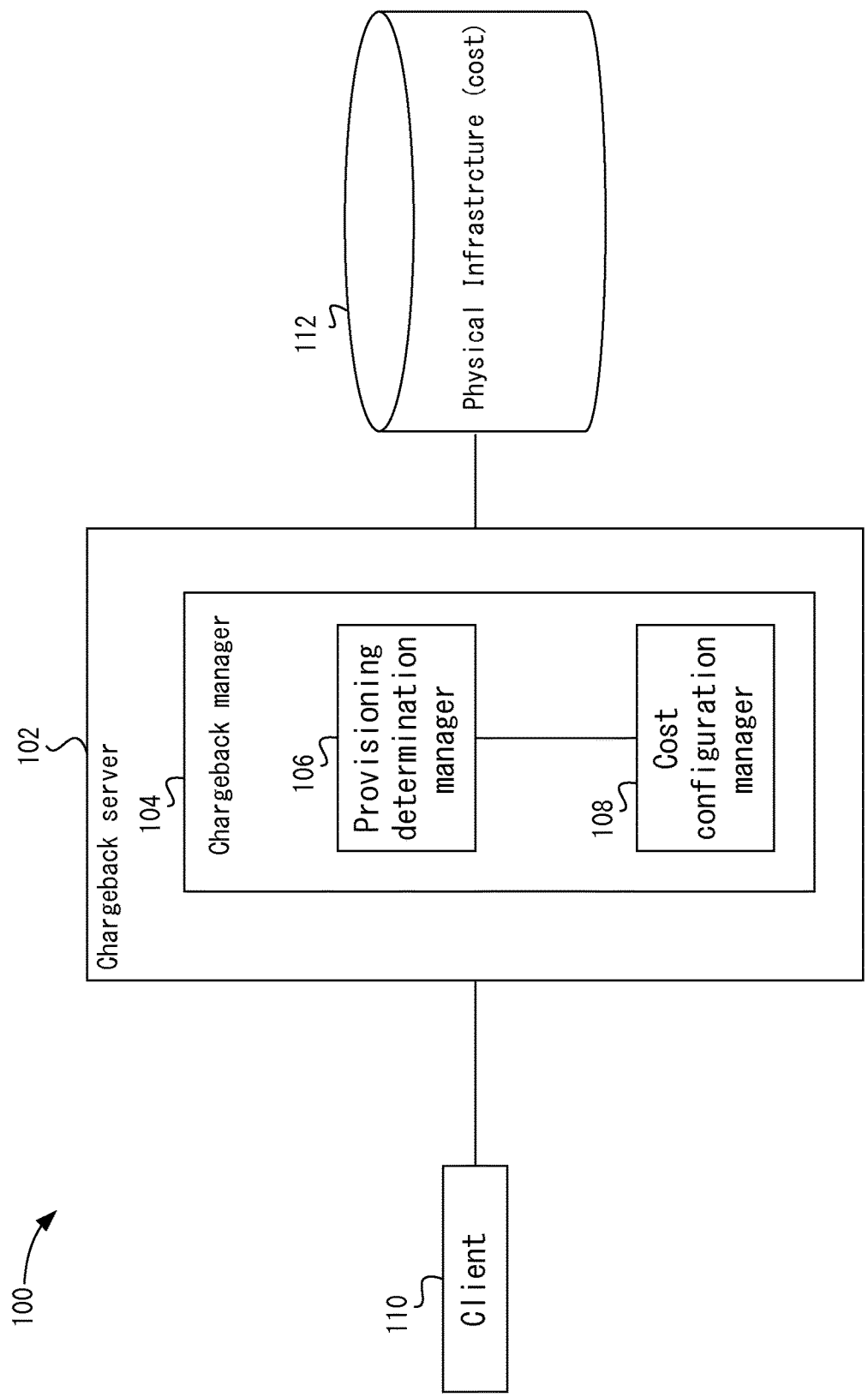
FIG. 1 depicts an example of a system for calculating costs for a virtual infrastructure according to one embodiment.

FIG. 1 depicts an example of a system 100 for calculating costs for a virtual infrastructure according to one embodiment. System 100 includes a chargeback server 102, a client 110, and a database 112.

Client 110 may be a computing device used to configure an application for charging an entity for use of a data center. The entity may be a company that is a customer of the data center. The data center may be leasing access of computing resources to the customer.

Chargeback server 102 uses a chargeback manager 104 to determine a cost that is used to calculate a charge for use of computing resources for the entity. For example, chargeback manager 104 may be an application that determines charges for the use of virtual machines in the data center.

Particular embodiments assign costs to a physical infrastructure of the data center. For example, the physical infrastructure of the data center may include physical computing devices, such as hosts (or clusters of hosts), datastores, and networks. The computing devices include computing resources. Computing resources may be a physical or virtual component of a computing device. For example, computing resources for a host may be defined as memory, CPU, disk read and write, disk read, disk write, network received and transmitted, network received, network transmitted, and virtual CPU (vCPU). Computing resources for datastores 304 may be an amount of storage. The amount of storage for datastores may be different from disk storage of a host, which is internal memory for the host. Also, computing resources for networks may be different networks with different quality of service guarantees. Computing resources for datastores may be an amount of storage provided to the virtual machine, the speed of access of data in the storage, or other storage features (e.g., mirroring). Costs may be configured for the computing devices in the physical infrastructure. For example, costs are configured for computing resources of the computing devices in the physical infrastructure.

A virtual machine may be instantiated in a virtual infrastructure for the entity. The instantiation may include a configuration of the virtual machine. Different examples of the configuration may be received. For example, the configuration may include information for a host, a datastore, a network. The configuration may be specified as a type of computing resource (e.g., a computer processing unit (CPU) of a certain speed), a specific physical computing entity (e.g., host H1), a level of service (e.g., a gold level), or in other ways that allow provisioning of a computing device.

A virtual machine is provisioned on a computing device, such as a physical host. Additionally, a network and datastore may be provisioned for use by the virtual machine. The virtual machine may then use computing resources of the provisioned computing devices. In one embodiment, the provisioning of the computing devices is performed by a separate application. Provisioning determination manager 106 queries the application that performs the provisioning on which computing devices were provisioned for the virtual machine. In another embodiment, the provisioning may be performed by provisioning manager 106.

The costs that are assigned to the physical infrastructure are stored in a chargeback database 112. For example, costs may be assigned to computing resources of computing devices in the data center. These costs are then automatically assigned to a virtual machine when the virtual machine is instantiated in a virtual infrastructure. For example, a cost configuration manager 108 retrieves costs from chargeback database 112 for computing resources of a computing device provisioned with the virtual machine. The costs of the computing resources may then be used to determine a charge for usage of the computing resources, which will be described in more detail below.

Accordingly, the charge for usage of the virtual machine may be determined based on costs that were assigned to computing resources of computing devices in the physical infrastructure. By assigning costs to computing resources of computing devices, a cost does not have to be manually input for a virtual machine. Rather, cost configuration manager 108 can automatically calculate costs for the virtual machine based on the costs assigned to computing resources for the computing device provisioned in the physical infrastructure. Because the physical infrastructure does not change as frequently as the virtual infrastructure, the assignment of costs may be reduced. For example, it may be more likely that virtual machines are added to the virtual infrastructure than computing devices are added to the physical infrastructure. Thus, costs may only need to be assigned when physical computing devices are added to the physical infrastructure.

Figure 2A:
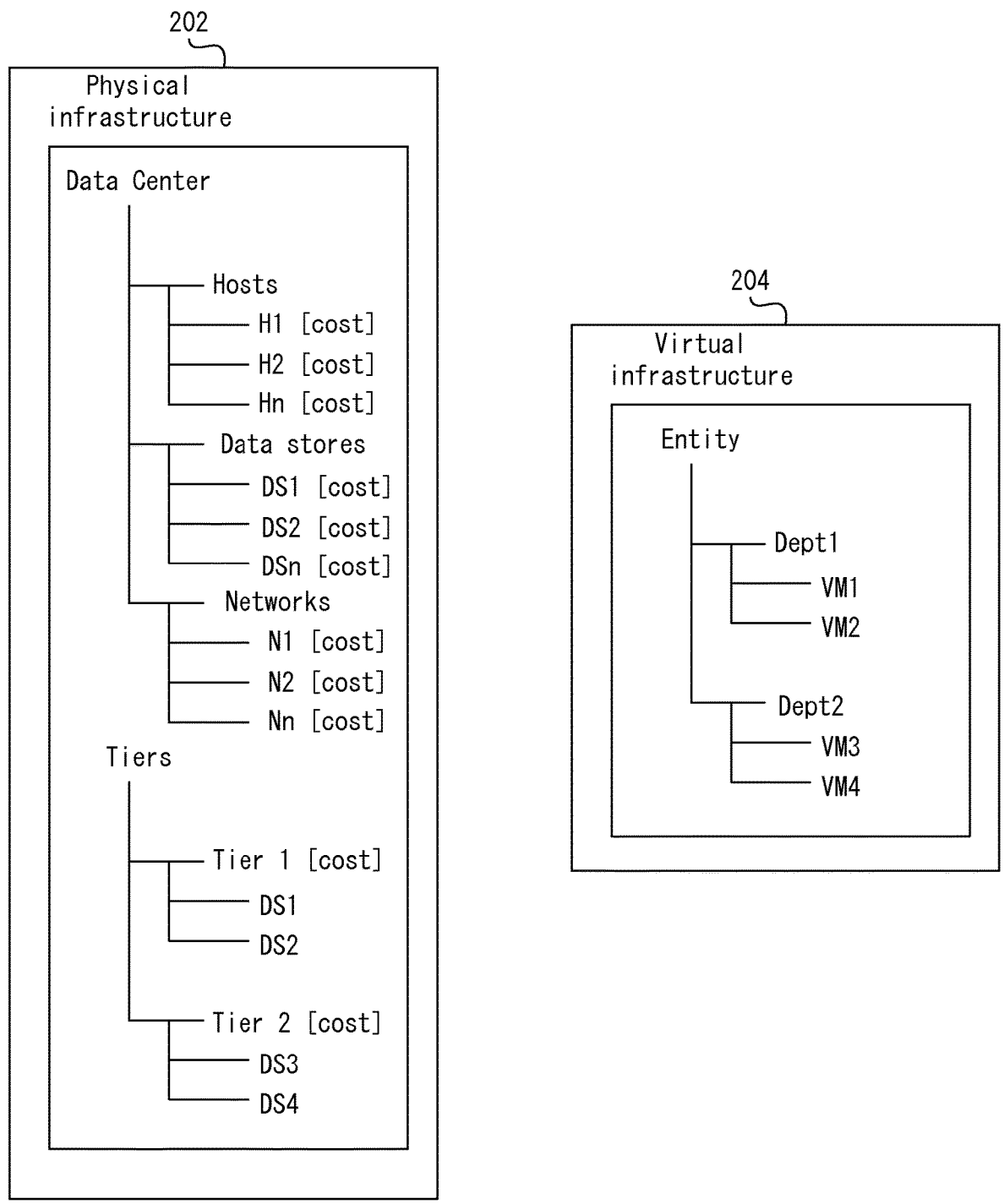
FIG. 2a depicts an example of a hierarchy for a physical infrastructure and a virtual infrastructure according to one embodiment.

The virtual infrastructure and physical infrastructure may be organized into hierarchies. A user may access the hierarchies and instantiate virtual machines to the virtual infrastructure or add costs to computing devices in the physical infrastructure. FIG. 2*a* depicts an example of a hierarchy for a physical infrastructure 202 and a virtual infrastructure 204 according to one embodiment. Although this hierarchy is shown, other ways of organizing physical infrastructure 202 and virtual infrastructure 204 may be used.

Virtual infrastructure 204 may be associated with an entity leasing access to computing resources of the data center. Virtual infrastructure 204 may be organized in an organizational hierarchy based on the entity. For example, different departments shown as a first department Dept1 and a second department Dept2 may be included in the entity. Different departments of the organization may be associated with different virtual machines. For example, department Dept1 is associated with a first virtual machine VM1 and a second virtual machine VM2. Department Dept2 is associated with a third virtual machine VM3 and a fourth virtual machine VM4. Different virtual machines may be instantiated in the organizational hierarchy. As different virtual machines are instantiated, a cost for the VM is automatically calculated.

Figure 3:
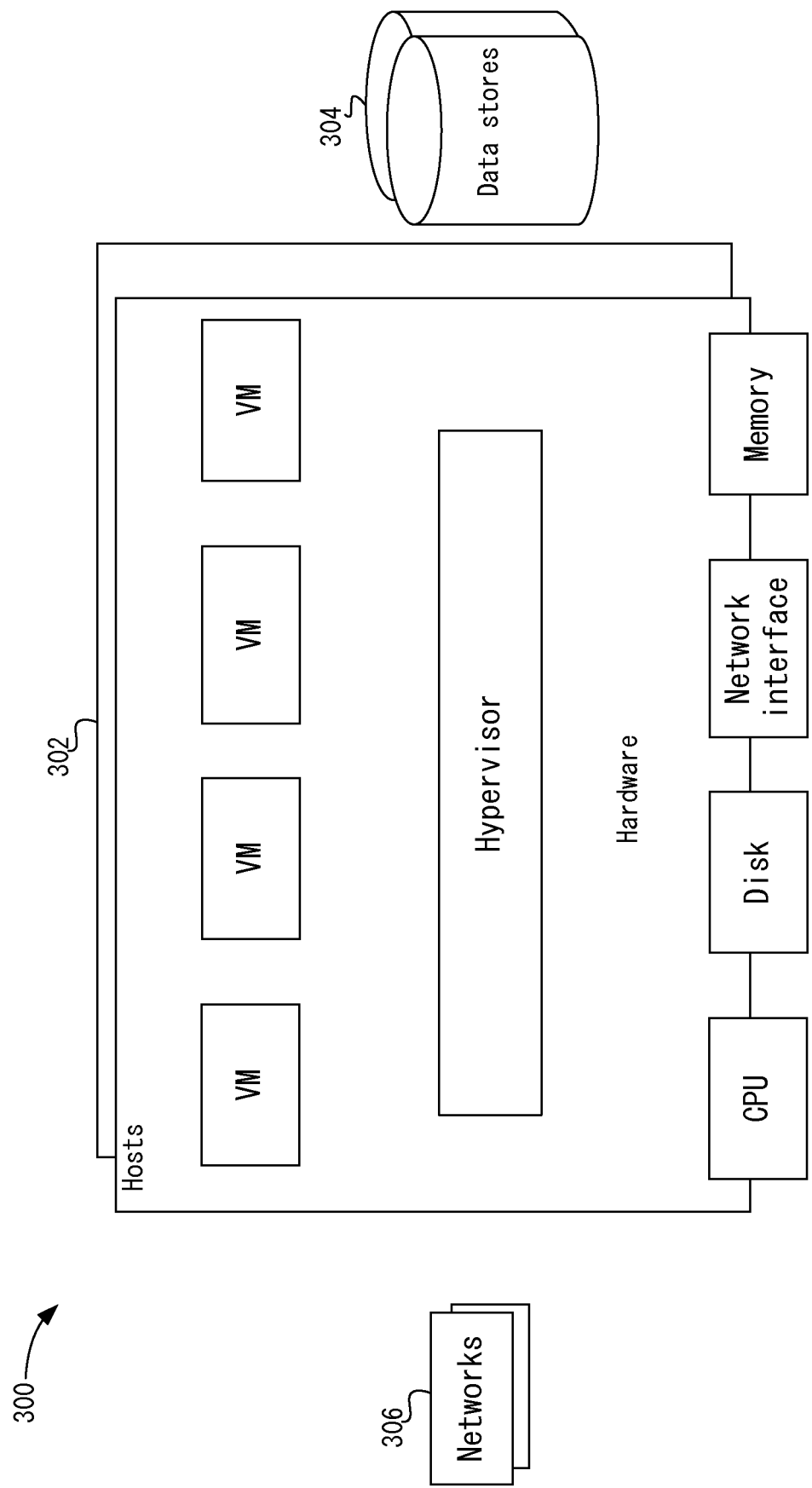
FIG. 3 illustrates a simplified example of a physical infrastructure of a data center according to one embodiment.

Physical infrastructure 202 may represent computing devices of the data center. FIG. 3 illustrates a simplified example of a physical infrastructure of data center 300 according to one embodiment. Data center 300 includes hosts 302, datastores 304, and networks 306.

Hosts 302 include basic system components such as a CPU, memory, a disk, and a network interface. Host 302 incorporates a hypervisor or virtual machine monitor. One or more virtual machines execute on the hypervisor. Host 302, in one embodiment, is a basic building block of a data center. When hosts 302 are described, it will be understood that similar actions may be performed for clusters of hosts. For example, costs may be assigned to clusters of hosts.

Datastores 304 may be a virtual instantiation of databases that are configured to store data for the entity. A number of disks may be used by a datastore 304 to store the data. Networks 306 are configured for the entity to transfer data. For example, networks may include local area networks (LANs) in the data center. Virtual machines may use datastores 304 and networks 306.

Referring back to FIG. 2*a*, in physical infrastructure 202, categories of hosts 302, datastores 304, and networks 306 are listed in the hierarchy. Each category may identify various computing devices that correspond to physical computing devices in the data center. For example, hosts 302 may include hosts H1 . . . Hn. Similarly, datastores 304 include datastores DS1 . . . DSn and networks 306 include networks N1 . . . Nn. Costs may be assigned to computing devices and/or the computing resources of the computing devices. For example, a cost is shown as being associated with each host 302, datastore 304, and network 306.

The costs for the computing device may be configured for general use of the computing device itself or may be further defined for computing resources of the computing device. Different costs may be assigned to different computing resources. For example, different factors may be used to determine the costs for each computing resource, such the speed of the computing resource, the size of the data storage, etc. For hosts 302, costs may be configured for the computing resources for hosts 302 for CPU, disk read and write, disk read, disk write, memory, network received and transmitted, network received, network transmitted, and vCPU.

FIG. 2*b* shows an example of configured costs for computing resources according to one embodiment. A table 250*a* shows costs configured for computing resources for a first host H1 and a table 250*b* shows costs configured for computing resources for a second host H2. A column 252 shows the computing resources available in each host. Also, a column 254 includes the costs assigned to the computing resources. The costs may be based on units, such as gigahertz (GHz) for speed and gigabytes (GB) for storage.

Different costs may be assigned to computing resources for datastores DS1 and DS2. Different factors may be taken into account. For example, datastore DS1 could be created on a slower and less expensive storage, while datastore DS2 could be created on a faster and mirrored storage. The faster storage with more robust features may be configured with a higher cost. The cost for each computing resource may be configured. For example, a cost may be manually inputted for each computing resource of datastores DS1 and DS2. Also, a base cost may be configured for computing resources. Then, a rate factor may be applied to the base cost for each computing resource on different computing devices. For example, the base cost for storage may be $1/GB-hr. A rate factor of 2 may be applied for datastore DS1 so that a cost of $1*2=$2/GB-hr is configured for datastore DS1. A rate factor of 3 may be applied for datastore DS2 so that a cost of $1*3=$3/GB-hr is configured for datastore DS2.

Storage for the virtual machine is provisioned from the datastore. The storage for the virtual machine may be a virtual machine disk. So, if a virtual machine disk resides on a datastore, the rate factor of that datastore is applied for charging.

Referring back to FIG. 2*a*, computing resources, such as CPU, memory, and/or datastores of physical infrastructure 202 may also be defined in multiple tiers. For example, tiers for datastores are shown in FIG. 2*a*, but tiers may be used in other computing resources. A cost may be defined for a tier that may include multiple datastores 304. In one example, a tier 1 for data storage may include datastore DS1 and datastore DS2. A tier 2 may include datastore DS3 and datastore DS4. A cost for tier 1 may be defined as a first cost (e.g., $1/GB-hr) and a cost for tier 2 may be defined as second cost (e.g., $2/GB-hr). When storage for a virtual machine is provisioned from a datastore 304 in one of the tiers, the cost for the tier is determined as the cost. For example, if the virtual machine is provisioned storage from datastore DS2, a first cost of $1/GB is assigned because datastore DS2 is part of tier 1.

The tiers may be used because multiple datastores 304 may be created from a physical storage device. As multiple datastores 304 are created from the same physical storage device, these datastores 304 may be grouped together in a tier and a cost is assigned to the tier. The tiering simplifies costs in that datastores 304 created from the same underlying physical storage device may be assigned the same cost.

Other methods may also be used to group datastores 304. For example, service levels for datastores 304 may be used to group datastores 304 into tiers. In one example, if a physical storage is mirrored or backed up, a datastore 304 in this group may be assigned a higher cost.

The hierarchies for physical infrastructure 202 and virtual infrastructure 204 may be stored in chargeback database 112. The costs associated with computing devices are then used to determine a cost for a virtual machine.

In some embodiments, a fixed cost may be assigned to a virtual machine for using certain features. For example, if the virtual machine uses a policy, such as high availability (HA), fault tolerance (FT), a fixed cost may be assigned for the use of those policies. Further, a fixed cost may be used for an operating system used by host 302. The fixed cost may override the automated cost that could be calculated for the virtual machine based on the provisioning, or may be used in conjunction with the automated cost.

Figure 4:
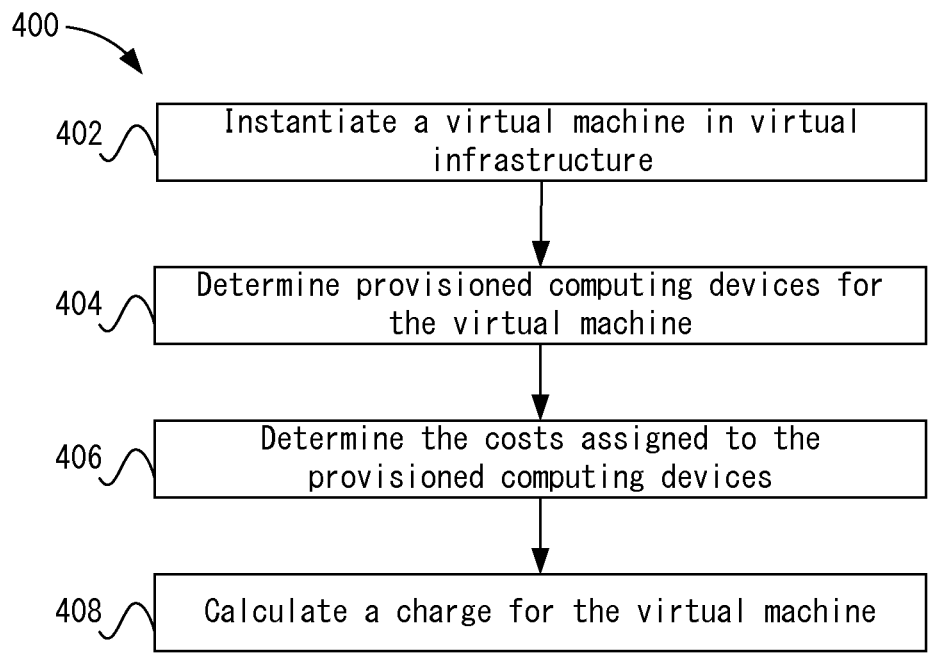
FIG. 4 depicts a simplified flowchart of a method for calculating a cost for a virtual machine according to one embodiment.

FIG. 4 depicts a simplified flowchart 400 of a method for calculating a cost for a virtual machine according to one embodiment. At 402, a virtual machine is instantiated in virtual infrastructure 204. The virtual machine may specify computing device/computing resource requirements for the virtual machine. For example, a specific host or a level of service may be specified.

At 404, provisioned computing devices are determined for the virtual machine. For example, an application may provision a computing device from physical infrastructure 202 for the virtual machine. The virtual machine may use computing resources from the computing device. The computing devices that are being used by the virtual machine are then determined based on the provisioning.

At 406, the costs that are assigned to the provisioned computing devices are determined. For example, database 112 is accessed and the costs for various computing resources of the computing devices are retrieved. The computing resources that are used to charge an entity may vary. For example, the data center may decide to charge based on CPU and memory use for a host. This is configurable by the data center and is described in more detail below with respect to billing policies.

At 408, a charge for the virtual machine is calculated. For example, the charge may be a summary of charges associated with the usage of the computing resources for the computing device.

In one embodiment, the charge is calculated using a billing policy. A billing policy is a method of how to calculate usage of computing resources. The usage is defined by attributes, which define what type of use to measure for the computing resource. A resource billing policy may be selected for a computing resource. The resource billing policy is defined with attributes associated with the computing resource. If multiple computing resources are being charged to a virtual machine, then a VM billing policy may be formed, which includes resource billing policies for the multiple computing resources.

Attributes and units are assigned to computing resources. For example, different computing resources may be associated with attributes. In one example, CPUs may have the following attributes and units shown in Table 1.

TABLE I

|  | Attribute | Unit |
|---|---|---|
| CPU | Reservation | GHz |
|  | Usage | GHz |
|  | Allocation | GHz |

Each CPU may have the same attributes and units. The attribute is the type of use and the unit is the measurement of the use. The attribute reservation may be the amount of CPU time that is reserved. The usage attribute may be the amount of time the CPU is used. The allocation attribute may be the number of the CPUs allocated. The unit is GHz, which may be the speed of a CPU.

Different computing resources may have different attributes with the same or different units. For example, Table 2 shows a table summarizing the attributes and units for a memory computing resource.

TABLE II

|  | Attribute | Unit |
|---|---|---|
| memory | Reservation | GB |
|  | Usage | GB |
|  | Allocation | GB |
|  | Size | GB |

The reservation, usage, allocation, and size are shown in a unit of size, such as GB. The reservation attribute may be the amount of memory that is reserved; the usage attribute may be the amount of memory that is used; the allocation attribute may be the amount of memory that is allocated; and the size attribute may be the size of the memory provisioned. The attributes of memory are measured in GB units. Other computing resources may include associated attributes and units that are assigned to them.

Figure 5:
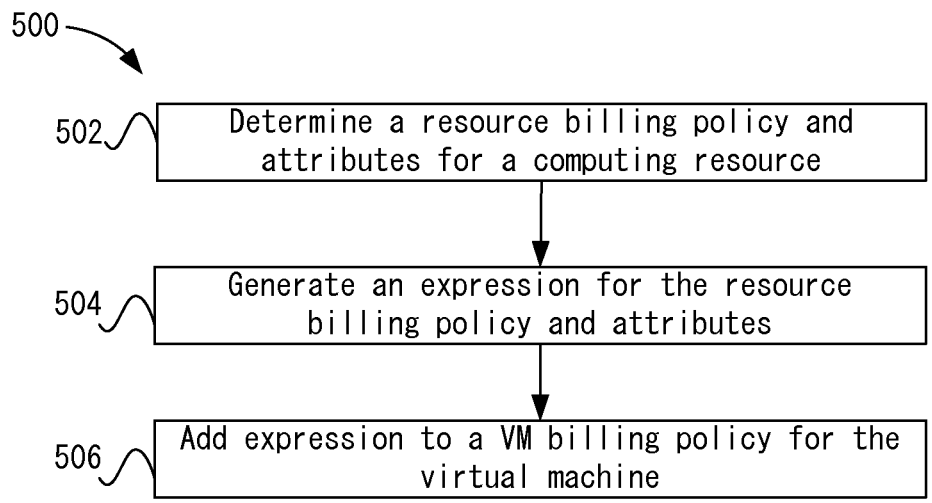
FIG. 5 depicts a simplified flowchart of a method for determining a VM billing policy according to one embodiment.

FIG. 5 depicts a simplified flowchart 500 of a method for determining a VM billing policy according to one embodiment. At 502, a resource billing policy and attributes for a computing resource are determined. The resource billing policy is a method used to determine usage for an attribute of a computing resource. For example, an attribute defines what is measured for the computing resource, such as the number of CPUs allocated may be measured. The use of the CPU by a virtual machine may be sampled multiple times during a period, such as the number of CPUs that are allocated is measured multiple times. Different ways of determining the usage over that period may then be used. For example, the resource billing policy may take the average of the CPUs allocated over the period, take the maximum CPUs allocated in a sample in the period, or a percentage of the maximum CPUs allocated over the period.

For a single billing policy, any number of attributes may be defined. For example, the attributes "allocation" and "reservation" may be defined. In this case both attributes are used by the resource billing policy. Also, although a single billing policy for a computing resource is discussed, multiple billing policies for a computing resource may be used.

At 504, an expression for the resource billing policy and attributes is generated. The expression includes an operation and attributes. The operation may be a way to measure the usage of the attributes together, such as maximum, addition, minimum, and other operators. For example, an expression of "Max(CPU usage, CPU reservation)" may indicate that the maximum of used and reserved units of CPU is considered for the cost calculation during the time period.

At 506, the expression is added to a VM billing policy for the virtual machine. For example, multiple resource billing policies for computing resources may be generated using the process above and form a VM billing policy for the virtual machine.

A flexible billing structure is provided using the billing policies. For example, a data center can choose how to bill computing resources for a computing device. The billing policies may be defined per a computing device, a computing resource, or per customer. For example, a billing policy may define an average CPU usage as a billing policy. This billing policy may be applicable to all customers that use host H1. Thus, when a virtual machine is provisioned with host H1, this billing policy is used. Also, the billing policy may be adjusted for different customers. For example, the billing policy may be specified for one customer to be maximum CPU reservation for host H1. This gives the data center flexibility in billing for use of computing resources.

Figure 6:
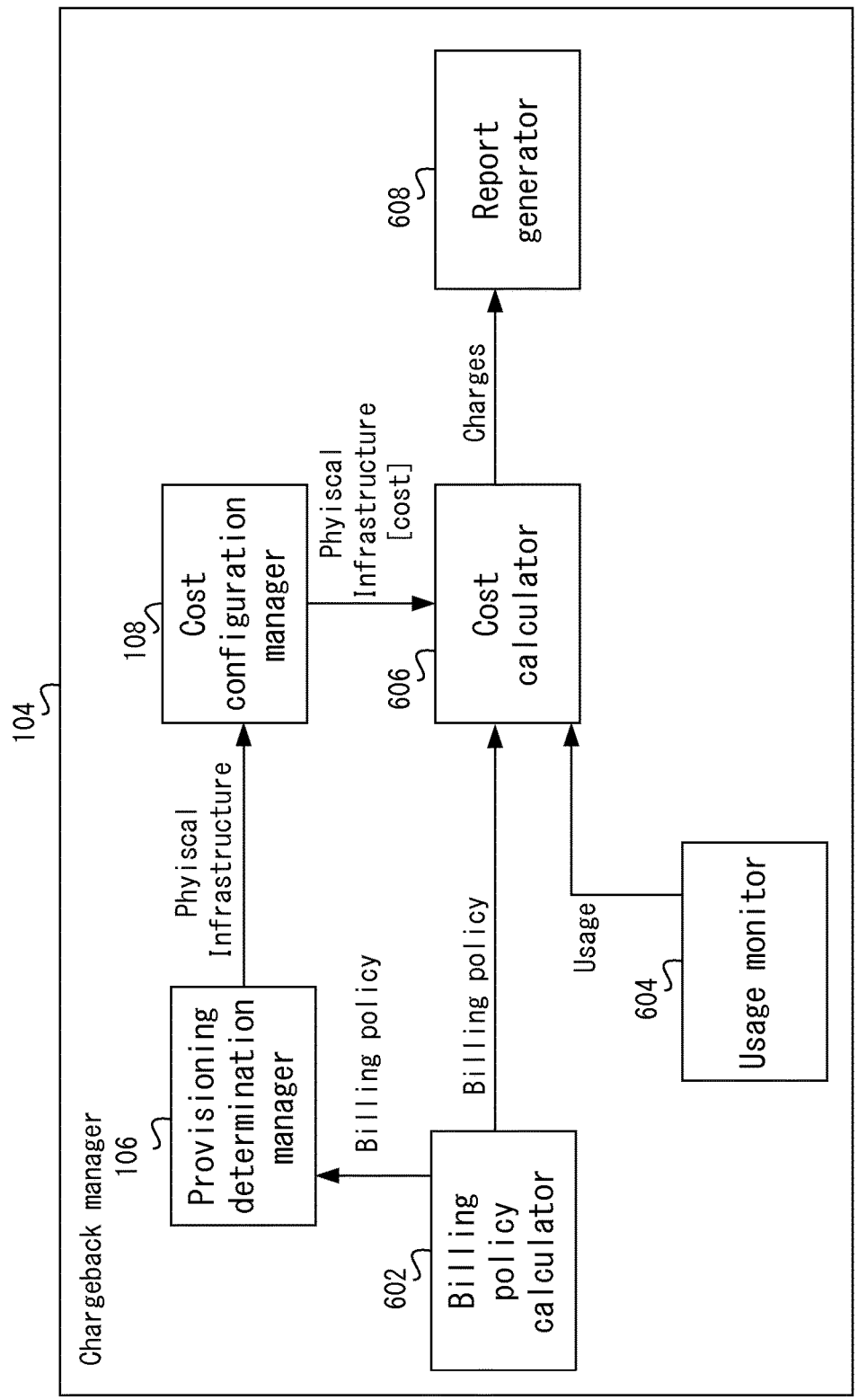
FIG. 6 depicts a more detailed example of a chargeback manager according to one embodiment.

Once the VM billing policy is generated, usage of computing resources may be monitored and applied to the VM billing policy. FIG. 6 depicts a more detailed example of chargeback manager 104 according to one embodiment. Chargeback manager 104 may include a billing policy manager 602, a usage monitor 604, provisioning determination manager 106, cost configuration manager 108, a cost calculator 606, and a report generator 608.

Billing policy manager 602 generates a VM billing policy. For example, resource billing policies for computing devices provisioned to the virtual machine are determined and added to the VM billing policy as described above.

Usage monitor 604 receives usage data for computing devices for the virtual machine. For example, computing resources used by the virtual machine are monitored. The monitoring includes collecting data for CPU use, memory use, disk use, network use, etc.

Provisioning determination manager 106 determines the computing devices that are provisioned with the virtual machine. For example, provisioning determination manager 106 queries a provisioning application to determine which computing devices were provisioned with the virtual machine. The computing resources being used by the virtual machine are associated with the computing devices. Cost configuration manager 108 then determines the costs associated with computing resources of the computing devices. In one example, costs for the computing resources being billed for are determined. For example, if a data center is only charging for CPU use of a host 302 being used by a virtual machine, the cost for CPU use is determined.

Cost calculator 606 receives the cost for the computing resources of the computing devices provisioned to the virtual machine and the VM billing policy for the computing resources. Cost calculator 606 determines the usage of the computing resources based on the billing policy. For example, the billing policy is applied to the usage data to determine the use during a period, such as an average CPU use is determined. Then, the charge for a computing resource is determined. For example, cost calculator 606 determines the charge based on the usage and the cost for a computing resource. In one example, if the average usage of a CPU is 1 GHz for an hour, and the cost for that CPU is $2/GHz-hr, then the charge is $2.00. The above calculation may be performed for all the computing resources being billed to the virtual machine.

Report manager 608 may then generate a report with the charge for the VM and send it to the entity. For example, the charges for each of the computing resources used and charged to the VM may be included in the report.

An example will be described referring to FIG. 2b. A first virtual machine VM1 and a second virtual machine VM2 may be instantiated in a virtual infrastructure for an entity. The first virtual machine VM1 is provisioned to a computing device of host H1 and the second virtual machine is provisioned to a computing device of host H2 in physical infrastructure 202. The billing policy defines the computing resources as CPU usage and memory usage for host H1 and CPU reservation and memory usage for host H2. A billing policy for virtual machine VM1 is thus CPU usage and memory usage for host H1 and a billing policy for virtual machine VM2 is CPU reservation and memory usage for host H1. Both billing policies use the average of the usage data received.

The costs for host H1 are $2/hr for CPU usage and $1/hr for memory usage. The costs for Host H2 are $3/hr for CPU reservation and $1.5/hr for memory usage. The average of the usage of the computing resources is then determined. For example, an average CPU use and memory use are determined for virtual machine VM1 on host H1. Also, an average CPU reservation and memory usage are determined for virtual machine VM2 on host H2. The respective costs are applied to the usage to determine a charge for virtual machine VM1 and virtual machine VM2.

Accordingly, particular embodiments assign costs to computing resources in physical infrastructure 202. These costs are used to determine a charge for a virtual machine. Thus, costs do not need to be assigned to virtual machines when a virtual machine is instantiated. Rather, costs that are assigned to computing resources of computing devices are used to determine a charge for usage of the virtual machine.

Billing policies may also be defined to provide finer granularity for charging for the usage of the virtual machine. For example, the billing policy defines attributes of the usage of computing resources that can be applied to different billing policies. The usage and cost for computing resources may then be applied to the billing policy to determine the charge for the usage of the virtual machine.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
receiving a request to instantiate a first virtual machine and a second virtual machine in a virtual infrastructure, the request identifying a configuration that includes a physical infrastructure and virtual computing resources for the first virtual machine and the second virtual machine to share; and
prior to instantiating the first virtual machine and the second virtual machine:
storing a billing policy and a cost assigned to the physical infrastructure and the virtual computing resources;
accessing the billing policy including the cost assigned to the physical infrastructure and the virtual computing resources; and
automatically creating a virtual machine billing policy specific to the first virtual machine and the second virtual machine using the billing policy including the cost for the first virtual machine and the second virtual machine to share use of the physical infrastructure and the virtual computing resources without an input to create the virtual machine billing policy after the virtual machine was instantiated, wherein the first virtual machine and the second virtual machine were not previously assigned the virtual machine billing policy before instantiation; and
upon instantiating the first virtual machine and the second virtual machine, applying the virtual machine billing policy specific to the first virtual machine and the second virtual machine.

2. The method of claim 1, wherein the virtual machine billing policy is used to determine a charge for the first virtual machine and the second virtual machine based on a shared usage of the physical infrastructure and the virtual computing resources.

3. The method of claim 2, wherein the charge is based on a combined usage limit, and wherein the method further comprises:
generating a report for the charge; and
Sending the generated report to an entity that requested the instantiation of the first and second virtual machines in the virtual infrastructure.

4. The method of claim 1, further comprising: defining a set of attributes for the virtual computing resources, wherein an attribute defines a way to measure usage of the virtual computing resources; and
wherein a billing policy defines a method to calculate usage of an attribute of the virtual computing resources.

5. The method of claim 4, further comprising:
receiving a selection of one or more attributes for the physical infrastructure and the virtual computing resources;
receiving a selection of an operation; and
generating an expression from the selection of the one or more attributes and the operation, the expression added to the virtual machine billing policy and used to determine the charge when the physical infrastructure and the virtual computing resources are used by one of the first virtual machine and the second virtual machine.

6. The method of claim 1, wherein one or more costs for use of the physical infrastructure and the virtual computing resources are determined, and the charge is determined based on the one or more costs for the physical infrastructure and the virtual computing resources and the usage of the physical infrastructure and the virtual computing resources.

7. The method of claim 1, further comprising:
determining a plurality of tiers for computing resources;
assigning a cost to each tier;

identifying a tier the physical infrastructure and the virtual computing resources are associated with; and using the cost of the identified tier to determine the charge for the first virtual machine and the second virtual machine.

8. A system, comprising:

a memory that stores a billing policy and costs associated with usage of each of a plurality of computing resources; and a processor programmed to:

receive a request to instantiate a first virtual machine and a second virtual machine in a virtual infrastructure, the request identifying a configuration for the first virtual machine and the second virtual machine, the configuration including the first virtual machine and the second virtual machine sharing a physical infrastructure and one or more of the plurality of virtual computing resources; and prior to instantiating the first virtual machine and the second virtual machine:

access the cost associated with sharing a usage of the physical infrastructure and one or more of the plurality of virtual computing resources by the first virtual machine and the second virtual machine; and automatically create a virtual machine billing policy specific to the first virtual machine and the second virtual machine using the costs associated with sharing a usage of the physical infrastructure and the one or more of the plurality of virtual computing resources by the first virtual machine and the second virtual machine without an input to create the virtual machine billing policy after the virtual machine was instantiated, wherein the first virtual machine and the second virtual machine were not previously assigned the virtual machine billing policy before instantiation; and upon instantiating the first virtual machine and the second virtual machine, applying the virtual machine billing policy specific to the first virtual machine and the second virtual machine.

9. The system of claim 8, wherein the virtual machine billing policy is used to determine a charge for the first virtual machine and the second virtual machine based on a shared usage of the physical infrastructure and the one or more of the plurality of virtual computing resources.

10. The system of claim 8, wherein the processor is further programmed to:

define a set of attributes for the one or more of the plurality of virtual computing resources, wherein an attribute defines a way to measure usage of each of the one or more of the plurality of virtual computing resources; and wherein a billing policy defines a method to calculate usage of an attribute of the one or more of the plurality of virtual computing resources.

11. The system of claim 10, wherein the processor is further programmed to:

receive a selection of one or more attributes for the one or more of the plurality of virtual computing resources;

receive a selection of an operation; and generating an expression from the selection of the one or more attributes and the operation, the expression added to the virtual machine billing policy and used to determine charges when the one or more of the plurality of virtual computing resources are used by the first virtual machine and the second virtual machine.

12. The system of claim 9, wherein one or more costs for use of the physical infrastructure and the one or more of the plurality of virtual computing resources are determined, and the charge is determined based on the one or more costs for the physical infrastructure and the one or more of the plurality of virtual computing resources and the usage of the one or more of the plurality of computing resources.

13. The system of claim 8, wherein the processor is further programmed to:

determine a plurality of tiers for the plurality of virtual computing resources;

assigning a cost to each tier;

identifying a tier the one or more of the plurality of virtual computing resources are associated with; and using a cost of the identified tier to calculate the charge for the first virtual machine and the second virtual machine.

14. One or more non-transitory computer-readable storage mediums including computer-executable instructions that, when executed by one or more processors, cause the one or more processors to:

receive a request to instantiate a first virtual machine and a second virtual machine in a virtual infrastructure, the request identifying a configuration that includes the first virtual machine and the second virtual machine sharing a physical infrastructure and virtual computing resources; and prior to instantiating the first virtual machine and the second virtual machine:

storing a billing policy and a cost assigned to the physical infrastructure and the virtual computing resources;

access the billing policy including the cost assigned to the physical infrastructure and virtual computing resources; and automatically creating a virtual machine billing policy specific to the first virtual machine and the second virtual machine using the billing policy including the cost for the first virtual machine and the second virtual machine to share a use of the physical infrastructure and virtual computing resources without an input to create the virtual machine billing policy after the virtual machine was instantiated, wherein the first virtual machine and the second virtual machine were not previously assigned the virtual machine billing policy before instantiation; and upon instantiating the first virtual machine and the second virtual machine, applying the virtual machine billing policy specific to the first virtual machine and the second virtual machine.

15. The one or more non-transitory computer-readable media of claim 14, wherein the virtual machine billing policy is used to determine a charge for the first virtual machine and the second virtual machine based on a shared usage of the physical infrastructure and virtual computing resources.

16. The one or more non-transitory computer-readable media of claim 15, wherein the charge—the charge is based on a combined usage limit.

17. The one or more non-transitory computer-readable media of claim 14, wherein the computer-executable instructions further cause the one or more processors to:

define a set of attributes for the physical infrastructure and virtual computing resources, wherein an attribute defines a way to measure usage of the computing resources; and wherein a billing policy defines a method to calculate usage of an attribute of the physical infrastructure and virtual computing resources.

18. The one or more non-transitory computer-readable media of claim 17, wherein the computer-executable instructions further cause the one or more processors to:
  receive a selection of an operation; and
  generate an expression from the selection of the one or more attributes and the operation, the expression added to the virtual machine billing policy and used to determine the charge when the physical infrastructure and virtual computing resources are used by the first virtual machine and the second virtual machine.

19. The one or more non-transitory computer-readable media of claim 14, wherein one or more costs for use of the physical infrastructure and virtual computing resources are determined, and the charge is determined based on the one or more costs for the physical infrastructure and virtual computing resources and the usage of the physical infrastructure and virtual computing resources.

20. The one or more non-transitory computer-readable media of claim 14, wherein the computer-executable instructions further cause the one or more processors to:
  determine a plurality of tiers for the virtual computing resources;
  assign a cost to each tier;
  identify a tier the virtual computing resources are associated with; and
  use the cost of the identified tier to determine the charge for the first virtual machine and the second virtual machine.

* * * * *